US010353189B2

(12) United States Patent
Dai et al.

(10) Patent No.: US 10,353,189 B2
(45) Date of Patent: Jul. 16, 2019

(54) PHASE MICROSCOPY SYSTEM AND METHOD

(71) Applicant: TSINGHUA UNIVERSITY, Beijing (CN)

(72) Inventors: Qionghai Dai, Beijing (CN); Mingjie Zhang, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 91 days.

(21) Appl. No.: 15/581,731

(22) Filed: Apr. 28, 2017

(65) Prior Publication Data

US 2018/0203221 A1   Jul. 19, 2018

(30) Foreign Application Priority Data

Jan. 13, 2017  (CN) .......................... 2017 1 0024959

(51) Int. Cl.
*G02B 21/36* (2006.01)
*G02B 21/08* (2006.01)
*G02B 21/14* (2006.01)

(52) U.S. Cl.
CPC ......... *G02B 21/365* (2013.01); *G02B 21/086* (2013.01); *G02B 21/14* (2013.01)

(58) Field of Classification Search
CPC .............. G02B 21/361; G02B 21/0056; G02B 21/086; G02B 21/365; G02B 21/14; G01J 9/00; G01N 21/00
See application file for complete search history.

(56) References Cited

U.S. PATENT DOCUMENTS 3,511,554 A * 5/1970 Van Ligten ............... G03H 1/00
                                                         359/30
5,831,736 A * 11/1998 Lichtman ............... G01B 11/24
                                                         356/613

(Continued)

FOREIGN PATENT DOCUMENTS

CN     101779155 A     7/2010

OTHER PUBLICATIONS

English translation of Office Action dated Sep. 5, 2018, from the State Intellectual Property office of China for CN Application 201710024959.2.

*Primary Examiner* — Dramos Kalapodas
(74) *Attorney, Agent, or Firm* — David D. Brush; Westman, Champlin & Koehler, P.A.

(57) ABSTRACT

A phase microscopy system and method are provided in the present disclosure. The system includes: an optical source, configured to generate collimated light; an object arrangement component, configured to provide a mask and a sample; a microscopic imaging component, including a microscope and a sensor, the microscope being configured to project light that passes successively through the mask and the sample into the sensor to capture an image; and a control component, configured to reconstruct phase information of the sample based on the image through both the sample and the mash and a pre-stored reference image of the mask, in which the pre-stored reference image is pre-acquired by the phase microscopy system without providing the sample under a same light condition. With the present disclosure, dynamic phase information of the microscopic sample can be acquired accurately and rapidly with high resolution.

9 Claims, 2 Drawing Sheets

(56) References Cited

U.S. PATENT DOCUMENTS

| | | | | |
|---|---|---|---|---|
| 5,995,645 A * | 11/1999 | Soenksen | ............ | G01B 11/0675 |
| | | | | 356/328 |
| 6,445,453 B1 * | 9/2002 | Hill | .................... | G02B 21/0056 |
| | | | | 356/450 |
| 6,614,520 B1 * | 9/2003 | Bareket | ............ | G01N 21/95607 |
| | | | | 356/237.3 |
| 8,855,265 B2 * | 10/2014 | Engel | ........................ | A61B 6/00 |
| | | | | 378/36 |
| 9,829,695 B2 * | 11/2017 | Kim | .................... | G01N 21/6452 |
| 10,228,554 B2 * | 3/2019 | Waller | .................... | G02B 27/52 |
| 2003/0223101 A1 * | 12/2003 | Curtis | ...................... | G03H 1/26 |
| | | | | 359/3 |
| 2009/0290156 A1 * | 11/2009 | Popescu | ............. | G01N 15/1434 |
| | | | | 356/338 |
| 2011/0025837 A1 | 2/2011 | Vossen et al. | | |
| 2012/0257040 A1 * | 10/2012 | Koebler | ................. | G02B 21/14 |
| | | | | 348/80 |
| 2016/0209646 A1 * | 7/2016 | Hattori | ................... | G02B 21/06 |
| 2016/0341946 A1 * | 11/2016 | Wenger | ................ | G02B 21/361 |
| 2017/0059845 A1 * | 3/2017 | Waller | .................... | G02B 27/52 |
| 2017/0118423 A1 * | 4/2017 | Zhou | ....................... | H04N 5/357 |
| 2017/0184483 A1 * | 6/2017 | Bartels | ............... | G01N 15/1434 |

\* cited by examiner

PHASE MICROSCOPY SYSTEM AND METHOD

CROSS REFERENCE TO RELATED APPLICATIONS

This Application claims priority to and the benefit of Chinese Patent Application No. 201710024959.2, filed Jan. 13, 2017, the content of which is incorporated herein by reference in its entirety.

FIELD

The present disclosure generally relates to a technical field of phase microscopy, and more particularly, to a phase microscopy system and a phase microscopy method.

BACKGROUND

A colorless and transparent object does not change the amplitude of the light passing through it, but changes a phase of the light. In addition, shape, density and structure of the object may be acquired from this changed phase. Therefore, the phase microscopy technology may be used to reconstruct structure and refractive index of the colorless and transparent object so as to make the colorless and transparent object visible.

SUMMARY

Embodiments of the present disclosure provide a phase microscopy system. The system includes: an optical source, configured to generate collimated light; an object arrangement component, configured to provide a mask and a sample; a microscopic imaging component, including a microscope and a sensor, in which the microscope is configured to project light that passes successively through the mask and the sample into the sensor, and the sensor is configured to capture an image; and a control component, configured to reconstruct phase information of the sample based on the image through both the sample and mask and a pre-stored reference image of the mask, in which the pre-stored reference image is pre-acquired by the phase microscopy system without providing the sample under a same light condition.

Embodiments of the present disclosure also provide a phase microscopy method. The phase microscopy method is applied to the phase microscopy system. The phase microscopy method includes: adjusting, by the control component, a field of vision of the system to a first area without the sample; controlling, by the control component, the microscopic imaging component to acquire the pre-stored reference image based on the first area; adjusting, by the control component, the field of vision of the system to a second area with the sample under the same light condition; controlling, by the control component, the microscopic imaging component to acquire the image based on the second area; acquiring, by the control component, a correspondence map between the image and the pre-stored reference image; and reconstructing, by the control component, phase information of the sample based on the correspondence map and an established model of the optical path of the system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Figure 1:
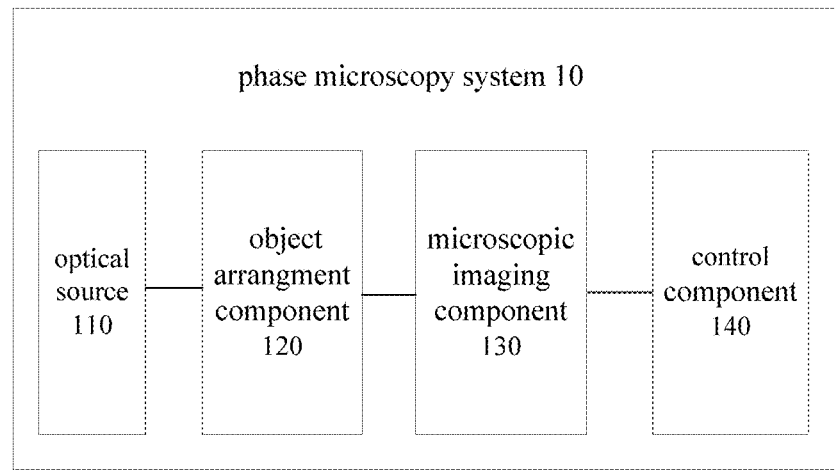
FIG. 1 is a block diagram illustrating a phase microscopy system according to embodiments of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

In the specification, it is to be understood that terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation, thus cannot be seen as restrictions to the present disclosure. In addition, terms such as "first" and "second" are used herein only for purposes of description and are not intended to indicate or imply relative importance or significance or to imply the number of indicated technical features.

It should be noted that in the description of the present invention, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements. The particular meanings of above terms can be understood by those skilled in the art according to specific situations.

These and other aspects of the embodiments of the present disclosure will become apparent with reference to the following descriptions and drawings. In these descriptions and drawings, some specific approaches of the embodiments of the present disclosure are provided, so as to show some ways to perform the principle of the embodiments of the present disclosure, however, it should be understood that the embodiment of the present disclosure is not limited thereby. Instead, the embodiments of the present disclosure comprise all the variants, modifications and their equivalents within the spirit and scope of the present disclosure as defined by the claims.

The embodiments of the present disclosure will be described hereinafter with reference to drawings.

FIG. 1 is a block diagram illustrating a phase microscopy system according to embodiments of the present disclosure. As shown in FIG. 1, the phase microscopy system 10 includes: an optical source 110, an object arrangement component 120, a microscopic imaging component 130 and a control component 140.

In detail, the optical source 110 is configured to generate collimated light. In an embodiment of the present disclosure, approximately collimated light may be provided to the system 10 as an input via narrowing an aperture of an optical source of the conventional microscopic. The object arrangement component 120 is configured to provide a mask and a sample.

In an embodiment of the present disclosure, there are two object arrangement components provided successively. One of the two object arrangement components is configured to provide the mask and the other of the two object arrangement components is configured to provide the sample. The object arrangement component configured to provide the sample is behind the object arrangement component configured to provide the mask along a direction of light propagation. The two object arrangement components may be movable in all directions. The distance between the two object arrangement components is very small and can be measured accurately. For example, as shown in FIG. 2, the sample is provided behind the mask along the direction of light propagation.

In an embodiment of the present disclosure, the mask is drawn with a reference pattern.

In an embodiment of the present disclosure, the mask with the reference pattern is configured to perform an amplitude modulation to the collimated light generated by the optical source 110, such that the collimated light provided by the optical source 110 may carry abundant texture information. Further, the phase of collimated light after the amplitude modulation is modulated by the sample, such that the collimated light after the amplitude modulation may carry phase information of the sample.

Figure 2:
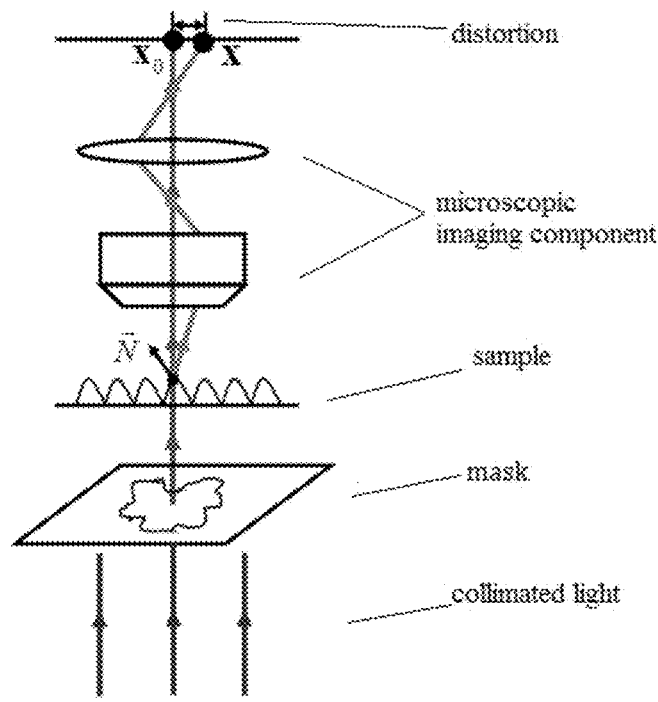
FIG. 2 is a schematic diagram illustrating a phase microscopy system according to embodiments of the present disclosure.

For example, as shown in FIG. 2, the amplitude of input collimated light is modulated by the mask with the reference pattern and then its phase is modulated by the sample. In order to improve accuracy, the reference pattern is a specially designed pattern with rich texture. The mask with the reference pattern and the sample are fixed on the object arrangement components at different locations of the system 10 and are free to move in all directions.

The microscopic imaging component 130 includes a microscope and a sensor (not shown in FIG. 1). The microscopic imaging component 130 is configured to project light that passes successively through the mask and the sample into the sensor to capture an image.

In an embodiment of the present disclosure, the microscope is provided between the sensor and the sample. The microscope is configured to project the light that passes successively through the mask and the sample into the sensor, and the sensor is configured to capture the image.

In an embodiment of the present disclosure, a focal position of the microscopic imaging component 130 is close to the mask with the reference pattern so as to shoot a dynamic distorted reference image clearly while guaranteeing a proper distance between the mask with the reference pattern and the sample.

The control component 140 is configured to control the optical source 110, the object arrangement component 120, and the microscopic imaging component 130. Further the control component 140 is configured to reconstruct phase information of the sample based on the image through both the sample and the mash and a pre-stored reference image of the mask, in which the pre-stored reference image is pre-acquired by the phase microscopy system without providing the sample under a same light condition.

In an embodiment of the present disclosure, the sensor is further configured to record a video. The control component 140 is further configured to reconstruct a phase video of the sample based on the video and the pre-stored reference image.

With the phase microscopy system according to the embodiments of the present disclosure, via shooting the reference image (i.e. the pre-stored reference image) without the sample and the image or the video with the sample, the phase information or the phase video of the sample can be acquired accurately and rapidly with high resolution.

Figure 3:
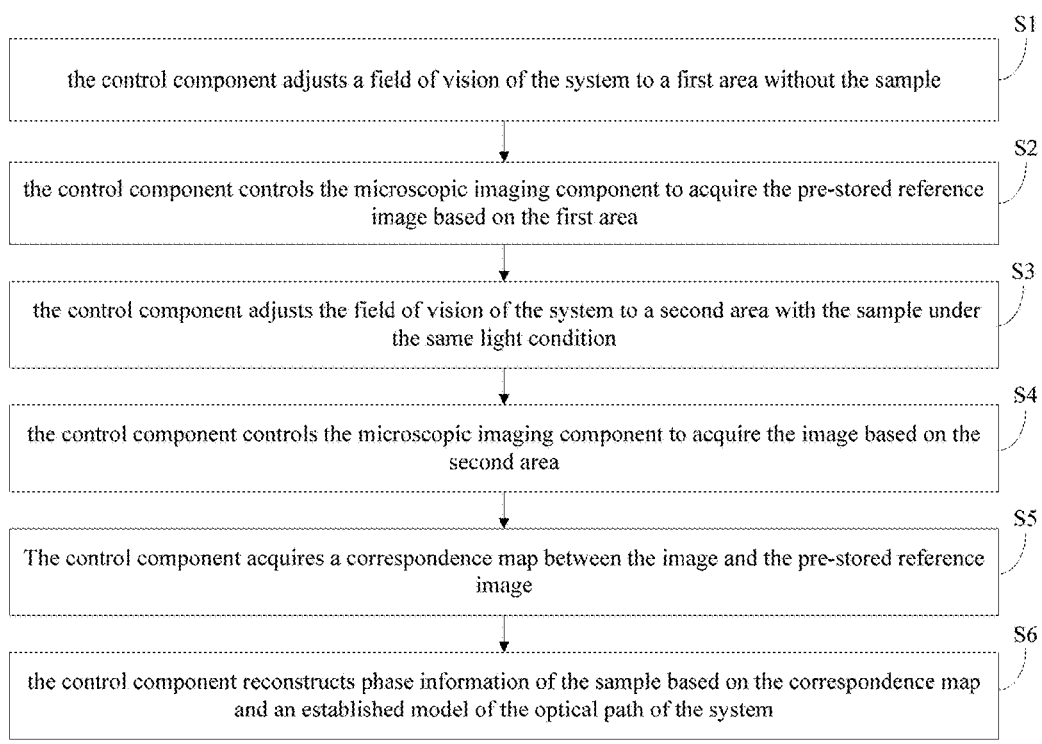
FIG. 3 is a flow chart of a phase microscopy method according to embodiments of the present disclosure.

A phase microscopy method is also provided in embodiments of the present disclosure. The phase microscopy method may be applied to the phase microscopy system according to the above embodiments. The method includes the followings, as shown in FIG. 3.

S1, the control component adjusts a field of vision of the system to a first area without the sample.

S2, the control component controls the microscopic imaging component to acquire the pre-stored reference image based on the first area.

In detail, as shown in FIG. 2, the straight ray illustrates an optical path corresponding to a pixel when there is no sample in the field of vision. Since there is no phase modulation performed by the sample in the optical path, the image acquired is the reference image via the amplitude modulation of the reference pattern without distortion. The above two steps should be done before the acquisition of the sample and the focal position of the sensor should be kept on a plane close to the mask with the reference pattern.

S3, the control component adjusts the field of vision of the system to a second area with the sample under the same light condition.

S4, the control component controls the microscopic imaging component to acquire the image based on the second area.

Further, in an embodiment, the control component controls the microscopic imaging component to acquire a video based on the second area.

In detail, the refracted ray illustrates an optical path corresponding to a pixel when there is the sample in the field of view. Since there are both amplitude modulation performed by the mask with the reference pattern and phase modulation performed by the sample in the optical path, each image in the video is a distorted image via phase modulation, thus the phase information may be obtained by the difference between the reference image and the frame image in the video. In S3 and S4, spatial positions and parameters of all the elements in the system cannot be changed, and are the same with the ones in S1 and S2, except for the sample.

S5, the control component acquires a correspondence map between the image and the pre-stored reference image.

Further, in an embodiment of the present disclosure, the control component acquires correspondence maps of each frame image in the video and the pre-stored reference image.

S6, the control component reconstructs phase information of the sample based on the correspondence map and an established model of the optical path of the system.

Further, in an embodiment of the present disclosure, the control component reconstructs a phase video of the sample based on the correspondence maps and an established model of the optical path of the system.

In an embodiment of the present disclosure, the correspondence map between the image and the pre-stored reference image includes a distortion of the pixel in the pre-stored reference image relative to the corresponding pixel in the image.

In detail, since each frame of the video and the reference image are shot under basically same illumination, the corresponding map may be calculated via an optical flow algorithm, and the optimization problem is:

$$\min_{w(x,t)} J(w(x,t)) = \min_{w(x,t)} E_d(w(x,t)) + \alpha E_m(w(x,t)),$$

where x={x, y} denotes the 2D spatial coordinates, t denotes the time dimension, w(x,t)=[u(x,t), v(x,t)] denotes the distortion images between distorted frame in the video at time t and the pre-stored undistorted reference image, J(w(x,t)) is a minimum optimization objective function, $E_d(w(x,t))$ is a data term of the objective function, $E_m(w(x,t))$ is a regularization term of the optimization objective function, α>0 is a regularization parameter that balances data term and regularization term.

In detail, the data term of the optimization objective function is:

$$E_d(w(x,t)) = \sum_{t=1}^{T} \int_{\Omega} \psi(\|I(x,t) - I(x+w(x,t),0)\|_2^2 + \gamma \|\nabla I(x,t) - \nabla I(x+w(x,t),0)\|_2^2) dx,$$

where T is the number of frames to be calculated in the video, $\Omega \subset R^2$ denotes a range of x, I(x,t) is a distorted frame image in the video at time t, I(x,0) denotes the reference image, $\psi(\xi^2) = \sqrt{\xi^2 + \varepsilon^2}$ is a modified L1 function, ε is a small positive number and γ is a coefficient.

The regularization term of the optimization objective function is:

$$E_m(w(x,t)) = \sum_{t=1}^{T} \int_{\Omega} \psi(\|\nabla u(x,t)\|_2^2 + \|\nabla v(x,t)\|_2^2) dx,$$

where u(x,t) and v(x,t) are the distortion image between distorted frame image in the video and reference image along x and y direction at time t, respectively, and $\nabla = (\partial x, \partial y, \partial t)^T$ denotes the spatial and temporal gradient operator.

Based on an established model of the optical path of the system, we also can obtain the relationship between distortion value and the gradient of phase information of the sample:

$$\frac{\partial \varphi(x,t)}{\partial x} =$$

$$\frac{\text{sgn}(H-h)u(x,t)}{\sqrt{u(x,t)^2 + v(x,t)^2 + \left[n\sqrt{u(x,t)^2 + v(x,t)^2 + \kappa^2(H-h)^2} - \kappa(H-h)\right]^2}}$$

$$\frac{\partial \varphi(x,t)}{\partial y} =$$

-continued $$\frac{\text{sgn}(H-h)v(x,t)}{\sqrt{u(x,t)^2 + v(x,t)^2 + \left[n\sqrt{u(x,t)^2 + v(x,t)^2 + \kappa^2(H-h)^2} - \kappa(H-h)\right]^2}},$$

where $\frac{\partial \varphi(x,t)}{\partial x}$ and $\frac{\partial \varphi(x,t)}{\partial y}$ denotes the gradient of phase of sample along x and y direction, respectively, sgn (●) is the sign function, H is the distance between the sample and objective lens, h is the distance between the focal plane and objective lens, |H−h| is the distance between the focal plane and sample, n is the refractive index of sample and κ is calibration parameter converting the world coordinate on the focal plane to pixel coordinate on the sensor. Then we can recover the phase information of the sample from the gradient field of phase by solving Poisson equation.

In addition, since other elements and functions of the phase microscopy system and method according to embodiments of the present disclosure may be already known by people skilled in the art, they will not be elaborated here so as to reduce redundancy.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of the present disclosure have been shown and described above, it should be understood by those skilled in the art, changes, alternatives, and modifications can be made to the embodiments without departing from spirit, principles, and scope of the present disclosure. The scope of the present disclosure is limited by the attached claims and its equivalents.

What is claimed is:
1. A phase microscopy system, comprising:
an optical source, configured to generate collimated light;
an object arrangement component, configured to provide a mask and to provide a sample, wherein:
  the mask has a reference pattern configured to modulate amplitude of the light; and
  the sample is configured to modulate phase of the light;
a first optical path along a direction of light propagation passing from the optical source, through the mask and without the sample;
a second optical path along the direction of light propagation passing from the optical source, through the mask and through the sample, wherein the sample is positioned behind the mask in the direction of light propagation;
a microscopic imaging component, comprising a microscope and a sensor, which are configured to:
  pre-acquire a reference image by projecting light that passes along the first optical path through the mask and into the sensor such that the sensor captures the reference image; and acquire an image by projecting light that passes along the second optical successively through the mask and the sample and into the sensor such that the sensor captures the image, wherein the reference image is pre-acquired by the phase microscopy system under a same light condition as the image, but without the sample; and a control component, configured to reconstruct phase information of the sample based on a distortion of each pixel in the reference image acquired through the mask relative to a corresponding pixel in the image acquired through both the sample and the mask.

2. The phase microscopy system according to claim 1, wherein the object arrangement component comprises two object arrangement components provided successively, and one of the two object arrangement components is configured to provide the mask and the other of the two object arrangement components is configured to provide the sample.

3. The phase microscopy system according to claim 2, wherein the object arrangement component configured to provide the sample is behind the object arrangement component configured to provide the mask along the direction of light propagation.

4. The phase microscopy system according to claim 1, wherein, a focal position of the microscopic imaging component is close to the mask with the reference pattern.

5. The phase microscopy system according to claim 1, wherein the sensor is further configured to record a video.

6. A phase microscopy method, applied to a phase microscopy system, wherein the system comprises:

an optical source, configured to generate collimated light;

an object arrangement component, configured to provide a mask and to provide a sample, wherein:

the mask has a reference pattern configured to modulate amplitude of the light; and the sample is configured to modulate phase of the light;

a first optical path along a direction of light propagation passing from the optical source, through the mask and without the sample;

a second optical path along the direction of light propagation passing from the optical source, through the mask and through the sample, wherein the sample is positioned behind the mask in the direction of light propagation;

a microscopic imaging component, comprising a microscope and a sensor, which are configured to:

pre-acquire a reference image by projecting light that passes along the first optical path through the mask and into the sensor such that the sensor captures the reference image; and acquire an image by projecting light that passes along the second optical successively through the mask and the sample and into the sensor such that the sensor captures the image, wherein the reference image is pre-acquired by the phase microscopy system under a same light condition as the image, but without the sample; and a control component, configured to reconstruct phase information of the sample based on a distortion of each pixel in the reference image acquired through the mask relative to a corresponding pixel in the image acquired through both the sample and the mask, and the method comprises:

adjusting, by the control component, a field of vision of the system to a first area without the sample, corresponding to the first optical path;

controlling, by the control component, the microscopic imaging component to acquire the reference image based on the first area;

adjusting, by the control component, the field of vision of the system to a second area with the sample under the same light condition, corresponding to the second optical path;

controlling, by the control component, the microscopic imaging component to acquire the image based on the second area;

acquiring, by the control component, a correspondence map between the image and the reference image; and reconstructing, by the control component, phase information of the sample based on the correspondence map and an established model of the optical paths of the system, which comprises reconstructing, by the control component, the phase information of the sample based on a distortion of each pixel in the pre-stored reference image relative to a corresponding pixel in the image and the established model of the optical paths of the system.

7. The phase microscopy method according to claim 6, which further comprises:

controlling, by the control component, the microscopic imaging component to acquire a video based on the second area; and acquiring, by the control component, the correspondence maps between each frame image in the video and the reference image; and reconstructing, by the control component, a phase video of the sample based on the correspondence maps and the established model of the optical path of the system.

8. The phase microscopy method according to 7, wherein the correspondence map between the image and the reference image comprises a distortion of the pixel in the reference image relative to the corresponding pixel in the image.

9. The phase microscopy method according to 7, wherein the correspondence map between each frame image in the video and the reference image comprises a distortion of the pixel in the reference image relative to the corresponding pixel in each frame image in the video.

* * * * *